United States Patent [19]

Tsumaki et al.

[11] Patent Number: 4,579,508

[45] Date of Patent: Apr. 1, 1986

[54] TURBOMOLECULAR PUMP

[75] Inventors: Nobuo Tsumaki, Ibaraki; Shinjiro Ueda, Abiko; Kousuke Noda; Hideki Izumi, both of Tsuchiura; Osami Matsushita; Takeshi Okawada, both of Ibaraki, all of Japan

[73] Assignee: Hitachi, Ltd., Tokyo, Japan

[21] Appl. No.: 484,892

[22] Filed: Apr. 14, 1983

[30] Foreign Application Priority Data

Apr. 21, 1982 [JP] Japan .................................. 57-65313

[51] Int. Cl.⁴ .......................... F01D 1/36; F04D 29/04
[52] U.S. Cl. .................................... 415/170 R; 415/90
[58] Field of Search ............. 415/90, 170 R; 417/354; 308/10

[56] References Cited

U.S. PATENT DOCUMENTS

| | | | |
|---|---|---|---|
| 4,023,920 | 5/1977 | Bächler et al. | 417/354 |
| 4,036,565 | 7/1977 | Becker | 308/10 |
| 4,111,595 | 9/1978 | Becker et al. | 417/354 |
| 4,147,396 | 4/1979 | Lyman | 308/10 |
| 4,180,370 | 12/1979 | Klatt et al. | 415/90 |
| 4,371,218 | 2/1983 | Ichikawa | 308/10 |

Primary Examiner—Everette A. Powell, Jr.
Attorney, Agent, or Firm—Antonelli, Terry & Wands

[57] ABSTRACT

A turbomolecular pump including a casing stationary blades arranged in a plurality of stages in the casing axially thereof, rotating blades arranged between the stationary blades and located on an outer periphery of a rotor located in a central portion of the casing, and a bearing device journaling the rotor at its high vacuum and end a low vacuum end. A first permanent magnet of the fixed side having a high Curie point and a second permanent magnet of the rotor side located in juxtaposed relation to the first permanent magnet constitute a magnetic bearing of an attraction type for journaling the rotor at its high vacuum end. A pivot type hydrodynamic bearing or active magnetic bearings journal the rotor at its low vacuum end.

6 Claims, 2 Drawing Figures

TURBOMOLECULAR PUMP

BACKGROUND OF THE INVENTION

This invention relates to turbomolecular pumps, and, more particularly, to a turbomolecular pump of the type suitable for use with equipment requiring ultrahigh vacua.

Generally, a turbomolecular pump is used with equipment requiring vacua, such as nuclear fusion devices, electron microscopes, etc, with the vacua obtained in turbomolecular pumps nowadays reaching as high as $10^{-11}$ Torr. In addition to higher vacua, so-called clean vacua have, in recent years, been in demand in which there is no residual gas of hydrocarbons, such as oil vapor.

The principle of the operations of turbomolecular pump is that the higher the molecular weight of a gas, the greater is the compression ratio thereof. Thus, a turbomolecular pump is able to readily exhaust oil vapor, making it possible to obtain clear vacua. However, a disadvantage of turbomolecular pumps using oil-lubricated ball bearings for journaling a rotor resides in the fact that, although the vacuum container is free from contamination with oil vapor during operation, diffusion in reverse of the vapor of lubricating oil occurs when the pump operation stops, so as to cause contamination of the vacuum container. To avoid this disadvantage, various proposals have been made to provide improvements in turbomolecular pumps, such as, for example U.S. Pat. No. 4,023,920, which provides a turbomolecular pump using controlled electromagnetic bearings.

However, demand for ultrahigh vacua has increased in recent years, and to meet this demand it is necessary to minimize gas releases from surfaces of parts of not only a vacuum chamber but also the pump itself. To this end, it is usual practice to rely on "baking" to release gas by heating the parts at high temperature when the pump is operated in ultrahigh vacua. More specifically, baking is performed to raise the temperature of the surfaces of the parts exposed to ultrahigh vacua to a high level to allow the gas that has been absorbed by the parts to be released as much as possible, before the pump as a whole is restored to a room temperature condition to obtain high vacuum therein. The effects achieved by baking can be increased by raising the temperature to a higher level. Thus, it would follow that it is very effective to raise the allowable temperature for performing baking in order to obtain higher vacua.

However there is some difficulty in raising the baking temperature as high as would be desired. In a turbomolecular pump now available, bearings for journaling a rotor are mounted on the high vacuum side or the suction side, and the bearings used for this purpose generally comprise ball bearings with dampers and active magnetic bearings with coils. The bearing mechanism of these types have an allowable temperature range of between about 100° and 120° C., because the ball bearings have their allowable temperatures limited by the allowable temperatures for the lubricating oil and the bearings themselves and the magnetic bearings by the temperature range to which the sheath of the winding is resistant. Such being the case, in the turbomolecular pumps now available, the baking temperature is restricted to a level below 120° C. which is the upper limit of the baking temperature range for parts around the suction port of the pump. As a result, it is difficult to achieve higher vacuum in ultrahigh vacua because there are limits placed on the allowable temperature range for baking.

The aim underlying the present invention essentially resides in providing a turbomolecular pump capable of avoiding the disadvantages encountered in the prior art while also achieving higher vacua than the prior art.

An object of the present invention is to provide a turbomolecular pump capable of achieving clean vacua not only when the pump is operative but also when it is inoperative.

In accordance with the present invention a turbomolecular pump is provided which comprises stationary blades axially arranged in a casing in a plurality of stages, and movable blades located between the stationary blades and mounted at an outer periphery of a rotor located in a center of the casing, with bearing means being provided for supporting the rotor at both a high vacuum end and a low vacuum end. The bearing means at the high vacuum end of the rotor includes a magnetic bearing of attraction type comprising a first permanent magnet of the fixed type having a characteristic such that the Curie point of the material is high, and a second permanent magnet located in juxtaposed relation to the first permanent magnet.

Additional and other objects, features and advantages of the invention will become apparent from the description set forth hereinafter when considered in conjunction with the accompanying drawings.

DETAILED DESCRIPTION

Figure 1:
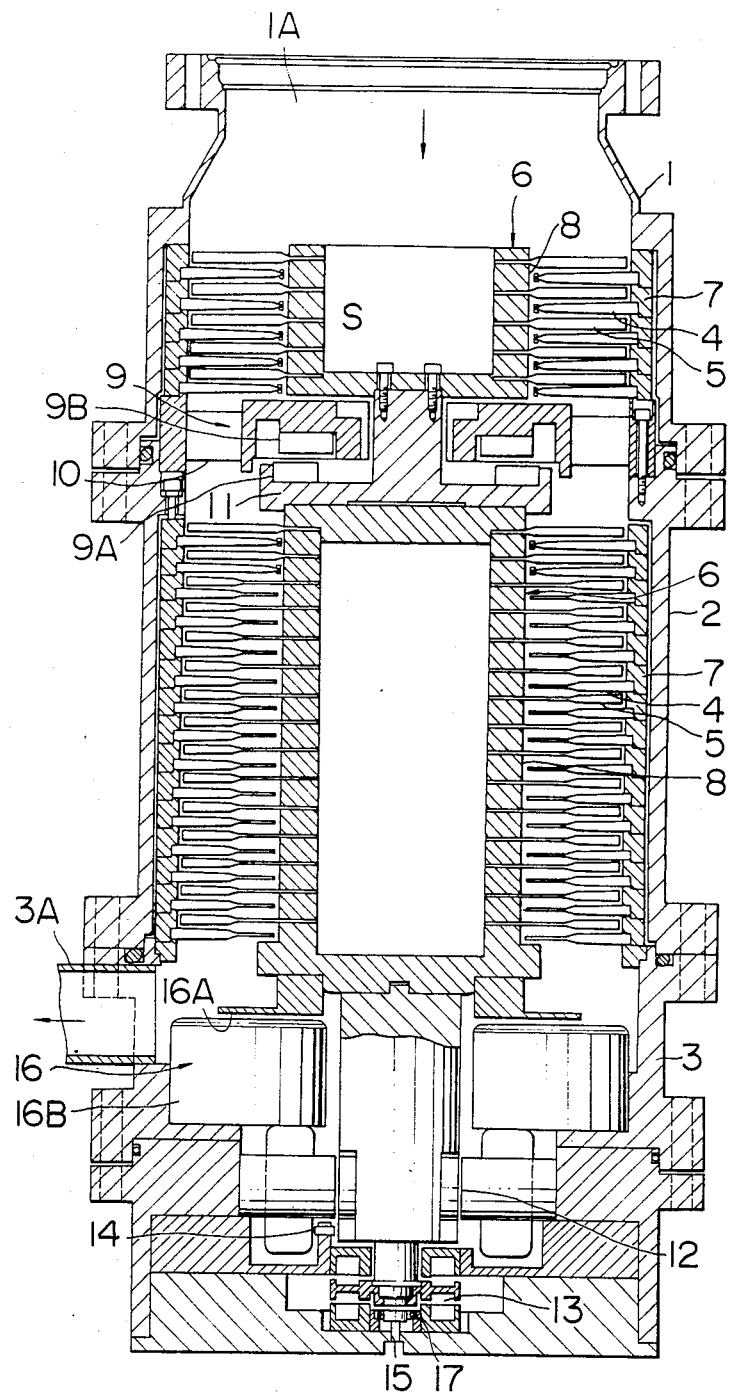
FIG. 1 is a vertical sectional front view of the turbomolecular pump comprising one embodiment of the invention.

Referring now to the drawings wherein like reference numerals are used in both views to designate like parts and, more particularly, to FIG. 1, according to this figure, a turbomolecular pump comprises a casing including a suction side casing member 1, formed with a suction port 1A, an intermediate casing member 2, and an exhaust side casing member 3, formed with an exhaust port 3A. The suction side casing member 1 and exhaust side casing member 3 are bolted to the intermediate casing member 2. Stationary blade 4 are arranged in a plurality of stages in an axial direction of the casing inwardly of the suction side casing member 1 and intermediate casing member 2. Rotating blades 5 are located between the stationary blades 4 and attached to a rotor generally designated by the reference numeral 6. The stationary blades 4 are inserted between spacers 7 of an annular shape superposed one over another in a vertically stacked relation, and the rotating blades 5 and stationary blades 4 are alternately superposed one above another in vertically stacked relation and inserted between spacers 8 constituting the rotor 6 and secured thereto as by diffusion bonding means. The movable blades 5 and spacers 7 and 8 are preferably formed of titanium alloy, stainless steel and the like to obtain high strength.

An annular space S for containing a permanent magnet generally designated by the reference numeral 9 is formed in an upper portion of the rotor 6 supporting the movable blades 5. The rotor 6 is journaled by an annular shape permanent magnet member 9A located on the rotor side of the space S and another annular shaped permanent magnet member 9B arranged in the space S in juxtaposed relation to the member 9A. In the permanent magnet 9, the annular permanent magnet members 9A and 9B may be of different diameters arranged on the rotor side, and the fixed side respectively, in a juxtaposed relationship. By using this magnet device, it is possible to exert a radial restoring force necessary to support the rotor 6. The permanent magnet member 9B is fixed to a support arm 10 extending radially from the joint between the suction side and intermediate casing members 1 and 2. The permanent magnet members 9A and 9B are formed of rare earth magnet of high Curie point. This specific magnet material is preferred when the need to perform baking is considered, because the magnetic characteristic of this material is not deteriorated when heated to 300° C.

The rotating blades 5 of at least more than one stage are located between the stationary blades 4 of the casing side in a portion of the rotor 6 above the bearing means of the high vacuum end or the permanent magnet 9. These movable blades 5 produce at the high vacuum end above the permanent magnet 9 a pressure corresponding to an unattained pressure component so that the gas released by the permanent magnet 9 will exert no influences on the suction side.

The rotor 6 is journaled at its lower portion by an active radial magnetic bearing 12 and a controlled thrust magnetic bearing 13. These magnetic bearings 12 and 13 are controlled by a radial sensor 14 and a thrust sensor 15, respectively.

The rotor 6 is driven by a motor 16 located in a lower portion of the rotor 6 at the low vacuum end. The motor 6 is in the form of a flat motor including a rotor plate 16A secured to the rotor 6, and a stator coil 16B secured to the exhaust side casing member 3. Alternatively, a high frequency motor may be used as the motor 16.

An auxiliary bearing 17 is attached to the rotor 6 at its lower portion where the magnetic bearing 12 is located, to aid in keeping the rotor 6 in rotation in the event of a power failure of active magnetic bearings. The auxiliary bearing 17 is in the form of a dry roller bearing using no lubricant, to keep the atmosphere clean. In place of a roller bearing, a pivot type bearing which is also dry may be used as the auxiliary bearing 17.

In the embodiment of FIG. 1, the rotor 6 is journaled at its upper portion or at the high vacuum end by the attracting force of the permanent magnet 9 and at its lower portion or at the low vacuum end by the magnetic bearings 12 and 13 for rotation in a stable manner. As the rotor 6 is rotated by the motor 16, gas molecules are drawn by suction from equipment to be evacuated into the suction port 1A and flow toward the exhaust port 3A at a high compression ratio, to be exhausted to outside therethrough. By this operation, a vacuum of more than $10^{-11}$ Torr can be achieved in the suction side casing member 1 of the turbomolecular pump as well as the equipment connected to the turbomolecular pump. It is because the following condition is satisfied that this ultrahigh vacuum can be achieved in the invention. The condition satisfied is that the parts in the suction side casing memeber 1 of the turbomolecular pump that are exposed to a ultrahigh vacuum can be subjected to baking at a temperature of about 300° C. For example, the rotating blades 5 and rotor 6 are formed of titanium alloy or stainless steel, and the permanent magnet 9 is formed of magnetic material of the rare earth base that can be treated at high temperature. It is very advantageous that the baking temperature can be raised to the aforesaid high level both from the point of view of raising an attainable vacuum and from the point of view of reducing the time required for achieving a ultrahigh vacuum. Meanwhile the magnetic bearings 12 and 13 located on the low vacuum side of the turbomolecular pump are exposed to a low vacuum, so that the baking performed at a temperature (about 120° C.) currently used for the purpose can be tolerated.

The embodiment of the invention constructed as aforesaid offers the following advantages. The use of bearing means constituted by the permanent magnet 9 for journaling the rotor 6 as a radial bearing in its upper portion or at the high vacuum end enables the number of active magnetic bearing members used to be greatly reduced as compared with the prior art, thereby enabling cost to be greatly reduced. The use of the auxiliary bearing 17 in the lower portion or at the low vacuum end of the rotor 6 allows the diameter of the bearing 17 to be reduced. This is conducive to reduced peripheral velocity during operation of the rotor 6. Although the auxiliary bearing 17 used is of a dry type, damage to the bearings in the event of emergency shutdown can be greatly reduced, thereby enabling trouble in maintenance to be minimized as compared with the prior art.

In the embodiment of FIG. 1 and, the magnetic bearings 12 and 13 have been described as being used for journaling the rotor 6 in its lower portion. However, these bearings 12 and 13 may be replaced by a pivot type hydrodynamic bearing generally designated by the reference numeral 18 shown in FIG. 2, with the pivot type hydrodynamic bearing 18 including a pivot shaft 18A and a bearing body 18B and immersed in a lubricant 19.

The use of the pivot type hydrodynamic bearing 18, which is small in the diameter of its shaft, offers the advantages that its peripheral velocity is low and that the amount of heat generated by its operation is low. Thus, when this type of bearing is compared with a roller bearing under the conditions of same load and same rpm, the use of this type of bearing offers the advantages that a lubricant of low vapor pressure and high viscosity can be used. One example of lubricant that can be used in the invention is a fluorine base oil having a vapor pressure of less than $10^{-13}$ Torr at room temperature.

Figure 2:
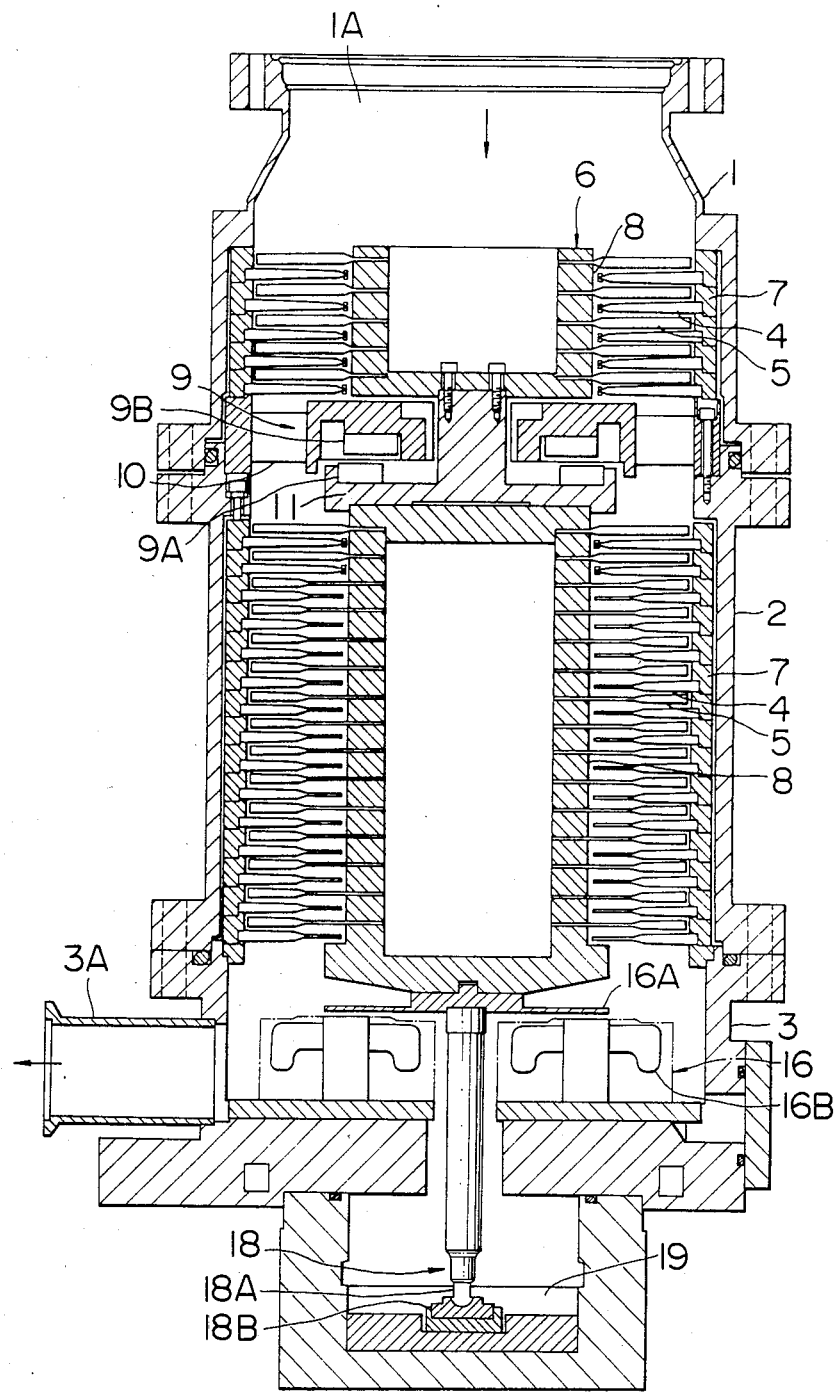
FIG. 2 is a vertical sectional front view of the turbomolecular pump comprising another embodiment of the invention.

In the embodiment shown in FIG. 2, it is possible to achieve a clean ultrahigh vacuum both during operation of the pump and when it is inoperative in the upper portion or on the suction side of the turbomolecular pump as is the case with the embodiment shown in FIG. 1, when the pivot type hydrodynamic bearing 18 is used. Meanwhile, the pivot type hydrodynamic bearing 18, lubricated with oil, is used for journaling the lower portion of the rotor 6, and this constitutes the only place for generating oil vapor. However, the lubricant used has a low vapor pressure, so that contamination of the pump with the vapor of lubricant can be minimized when the pump is inoperative.

This is an important advantage when the embodiment of the invention shown in FIG. 2 is compared with a turbomolecular pump of the prior art using a ball type bearing. In a pump of the prior art, it is oil of a vapor pressure of about $10^{-4}$ Torr, such as spindle oil, that has to be used for the ball bearing. Thus, when the pump is inoperative, diffusion in reverse of the oil vapor into the high vacuum end would occur, thereby causing contamination of the vacuum container. This problem is essentially eliminated in the embodiment of the invention shown in FIG. 2 because the partial pressure of oil vapor can be kept at a level below $10^{-10}$ Torr. Moreover, it is difficult for the oil used in the embodiment of FIG. 2 to vaporize, so that the need to provide an additional supply of oil is essentially eliminated thereby facilitating maintenance of the pump. In addition, the embodiment of FIG. 2 is advantageous from the point of view of cost as compared with a pump using active magnetic bearings, because the need to use a control section and electromagnet for each bearing can be eliminated.

From the foregoing description, it will be appreciated that in the turbomolecular pump according to the invention, parts thereof that are exposed to an ultrahigh vacuum can be subjected to baking at high temperature. This enables higher vacua to be obtained as compared with the vacua achieved by turbomolecular pumps of the prior art. Thus, the invention is capable of providing a turbomolecular pump reliable in performance in satisfying the demand of equipment requiring an ultrahigh vacuum to be achieved therein.

What is claimed is:

1. A turbomolecular pump comprising;
a casing;
a plurality of stationary blades arranged in a plurality of stages in said casing axially thereof;
a plurality of rotating blades alternately located between said stationary blades and arranged at an outer periphery of a rotor located in a central portion of said casing;
bearing means journalling said rotor on a high vacuum side and low vacuum side thereof, said bearing means comprising a first permanent magnet member located in a fixed position having a characteristic such that the Curie point of its material is high, and a second permanent magnet member on the rotor side located in spaced juxtaposed relationship to said first permanent magnet member, said first and second permanent magnet members constituting a magnetic bearing of an attraction type; and wherein said rotor has at least more than one stage of said rotating blades located at a higher vacuum end of said rotor above said bearing means at the high vacuum end, said at least more than one stage of said rotating blades being located between the sationary blades on the suction side so as to produce at the high vacuum end above said bearing means a pressure corresponding to an unattained pressure so that gas released by the permanent magnet member of the bearing means exerts no influence on the suction side of the pumps.

2. A turbomolecular pump as claimed in claim 1, wherein said permanent magnet members are formed of magnetic material of rare earth base.

3. A turbomolecular pump as claimed in claim 2, wherein said first permanent magnet member is supported by a support arm connected to said casing in such a manner that the first permanent magnet member is located in an annular space formed at the outer periphery of the rotor between the movable blades, and said second permanent magnet member is mounted on the rotor within said annular space in a manner to be juxtaposed against the first permanent magnet member.

4. A turbomolecular pump as claimed in claim 3, wherein said first permanent magnet member comprises a plurality of annular permanent magnet members of different diameters arranged concentrically with one another, and said second permanent magnet member juxtaposed against said first permanent magnet member comprises an annular permanent magnet member located in juxtaposed relation to said plurality of annular permanent magnetic members constituting the first permanent magnet member.

5. A turbomolecular pump as claimed in claim 1, wherein said bearing means at the low vacuum end of said rotor comprises an active magnetic bearing.

6. A turbomolecular pump as claimed in claim 1, wherein said bearing means at the low vacuum end of said rotor comprises a hydrodynamic bearing of the pivot type.

* * * * *